United States Patent [19]

Meshbesher

[11] Patent Number: 4,457,809
[45] Date of Patent: Jul. 3, 1984

[54] METHOD FOR OXIDIZING LOWER ALKANOLS TO USEFUL PRODUCTS

[76] Inventor: Thomas M. Meshbesher, 4507 Weldin Rd., Wilmington, Del. 19803

[21] Appl. No.: 404,815

[22] Filed: Aug. 3, 1982

Related U.S. Application Data

[63] Continuation-in-part of Ser. No. 199,939, Oct. 23, 1980, Pat. No. 4,347,109, which is a continuation-in-part of Ser. No. 151,254, May 19, 1980, abandoned.

[51] Int. Cl.$^3$ ............................ C25B 3/02; C25B 8/00
[52] U.S. Cl. ..................................... 204/59 R; 429/17
[58] Field of Search ................. 204/59 R, 79; 429/14, 429/17

[56] References Cited

U.S. PATENT DOCUMENTS 2,108,030  2/1938  Darrah ............................. 204/79 X
2,419,515  4/1947  Wolk ................................. 204/79 X
4,195,118  3/1980  Vasseen ................................ 429/15

FOREIGN PATENT DOCUMENTS 910870  11/1962  United Kingdom .

OTHER PUBLICATIONS

Langer et al., I & E C. Process Design & Develop., vol. 18, pp. 567–573, 10/79.
Schlatter, Fuel Cells, pp. 190–210, pub. by Wiley-Interscience, 1965.

*Primary Examiner*—John F. Niebling

[57] ABSTRACT

Methanol can be oxidized to formaldehyde gas, and ethanol can be oxidized (e.g. in two steps) to acetic acid, in an "electrogenerative" or "voltameiotic" cell (i.e. a fuel cell designed to produce useful oxidation products). The structure of the anode and the contact time with the anode are important factors helping to determine the degree of oxidation of the oxidized products.

4 Claims, No Drawings

METHOD FOR OXIDIZING LOWER ALKANOLS TO USEFUL PRODUCTS

CROSS-REFERENCE TO RELATED APPLICATIONS

This application is a continuation-in-part of my co-pending application Ser. No. 199,939 filed Oct. 23, 1980, now U.S. Pat. No. 4,347,109, which in turn is a continuation-in-part of U.S. Ser. No. 151,254 filed May 19, 1980, now abandoned.

TECHNICAL FIELD

This invention relates to the oxidation of methanol or ethanol to useful organic compounds, principally formaldehyde (from methyl alcohol) and acetic acid (from ethyl alcohol). The oxidation is carried out in an electrical cell which is either "electrogenerative" or "voltameiotic".

PRIOR ART

In co-pending application Ser. No. 199,939, now U.S. Pat. No. 4,347,109, there is a detailed discussion of electrochemical processes for oxidizing various types of fuels in a fuel cell. Typical examples of the relevant fuel cell literature and patents include British Pat. No. 910,870, published Nov. 21, 1962 (Esso Research) and M. J. Schlatter, *Fuel Cells,* ed. G. J. Young, Reinhold, New York, New York, 1963. See also Vielstich, *Fuel Cells,* Wiley-Interscience, 1965, particularly pages 99–101, and U.S. Pat. No. 3,280,014 (Kordesch et al), issued in October of 1966. For an excellent review article, see Langer et al, I. & E. Chem. Process Des. Dev. 18:567 (1979). For an electrochemical study of the interaction of ethanol with a noble metal catalyst, see Rightmire et al, *J. Electrochem. Soc.,* 111:242 (1964).

The aforementioned Langer et al article describes three types of reactions which can take place in the type of electrical device generally called "fuel cell".

First, when the "fuel cell" is used as such, a fuel is oxidized on an electrode surface with simultaneous production of direct current useful energy. An oxygen or air counterelectrode (cathode) is normally employed. Since complete combustion for maximum energy generation is desired, the products of fuel cell operation are usually of no value, except in special situations (e.g. water in space flights).

In an "electrogenerative process" on the other hand, suitable electrochemical reactions are coupled at opposing electrodes, separated by an electrolyte barrier, to yield the desired chemical product with the generation of low voltage energy as a by-product. Although a "fuel cell" is also an electrical energy generating system, it does not qualify as an "electrogenerative cell" when electrical energy is actually the primary product.

While production of useful energy can occur in an electrogenerative system, the high value of the chemical product produced by the system may overshadow the importance of any recoverable electrical energy produced by the cell. Accordingly, it is appropriate to consider the design and construction of cells which conserve energy but do not produce recoverable electrical energy. Such cells may require energy input to be operative, but typically, the energy input is very small due to the conservation effect. For example, one of the half-cell reactions may have a very favorable $E°$ while the other half-cell does not. Because of the one favorable $E°$, the overall electrolytic cell working voltage is reduced and energy input is small compared to a conventional electrochemical process such as electroplating. The term proposed by Langer et al for such energy-conserving processes is "voltameiotic". Voltameiotic processes are closely related to electrogenerative processes.

Lower alkanols have been extensively investigated as fuel for fuel cells, but the "electrogenerative" literature relating to the oxidation of these compounds is relatively sparse. It is known from the previously mentioned Esso research patent (British Pat. No. 910,870) that ethanol can be converted to acetic acid in a fuel cell with minor amounts of carbon dioxide and formic acid as by-products. This patent also reports that methanol can be oxidized in a fuel cell to a mixture of carbon dioxide, formic acid and formaldehyde. A typical fuel cell operation strives to minimize the formation of the acid and aldehyde intermediates, and in acid electrolyte cells, this can often be accomplished. In cells containing a basic electrolyte, it is difficult to avoid the formation of substantial amounts of a formate salt. Formaldehyde itself is a reasonably active fuel which can be used as a fuel feed for a conventional fuel cell.

In the fuel cell literature and even in some of the electrogenerative literature, the lower alkanols are considered to be attractive possibilities for oxidation because of their ability to dissolve in the electrolyte. It has, however, been recognized by Kordesch et al (U.S. Pat. No. 3,280,014), that one can pass the fuel feed through an electrogenerative oxidation zone defined, at least in part, by a porous carbon electrode which is also in contact with the electrolyte. In this arrangement, the "fuel" is introduced into the cell as a liquid or a gas which does not contact the electrolyte directly, except insofar as the porous electrode provides a gas/solid-/electrolyte or liquid/solid/ electrolyte interface.

As shown in copending application Ser. No. 199,939 (now U.S. Pat. No. 4,347,109), acetaldehyde can be obtained from ethanol in an electrogenerative cell. This result was considered surprising in view of the acetic acid product reported in the aforementioned British Pat. No. 910,870 and other references, particularly Schlatter,op.cit. It would be expected to be even more difficult to produce a high yield of formaldehyde from methanol in view of the high reactivity of this aldehyde in a fuel cell. Acetaldehyde and formaldehyde are somewhat analogous in fuel cell situations, except that acetaldehyde has a greater tendency to "poison" a noble metal catalyst. Apparently, the —CHO of the acetaldehyde can easily complex with these metals.

Formaldehyde is a gas at room temperature; however, it has a strong tendency to form a relatively non-volatile hydrate with water. Acetaldehyde is very water soluble. Consequently, both of these aldehydes can presumably pass into an aqueous electrolyte and become, in a sense, "trapped", at least temporarily. Both aldehydes can also trimerize to form ring-like structures and formaldehyde can polymerize to form a solid. The gaseous form of formaldehyde is rarely encountered as such in commerce. More typically, hydrated formaldehyde is sold as an aqueous solution containing, for example, about 37% formaldehyde.

Both formaldehyde and acetaldehyde are very useful intermediates. Manufacture of acetic acid from acetaldehyde used to be practical on an industrial scale; today however, there are more competitive ways for making acetic acid. Unfavorable economics can also occur in the case of formaldehyde. For example, this aldehyde can be converted to ethylene glycol by a very elegant electrochemical technique known as reductive dimerization, but ethylene glycol can also be manufactured from raw materials even less expensive than formaldehyde.

SUMMARY OF THE INVENTION

Briefly, this invention involves a method for making a $C_1$ to $C_2$ aldehyde or carboxylic acid from methanol or ethanol comprising the steps of: bringing the alkanol vapor (with or without the aid of a carrier gas) into contact with an anode of an electrogenerative or voltameiotic cell and bringing an oxidant into contact with the cathode of the cell, whereby the alkanol vapor is electrogeneratively or voltameiotically oxidized to the desired product, which for methanol is formaldehyde; in the case of ethanol, the desired product is acetic acid, which has certain economic and technical advantages over acetaldehyde, particularly a lower flammability.

It is important in the context of this invention that the oxidate or oxidized product remain in the gaseous state and remain within the electrogenerative or voltameiotic oxidation zone defined, at least in part, by the catalytic side of the anode, so that the amount of aldehyde or acid which passes into the electrolyte of the cell is minimized. To accomplish this objective, it is extremely important that the anode comprise a metallic electrocatalyst and a hydrophobic polymer in varying ratios. On the porous catalytic side or face of the anode (the face in contact with the alkanol vapor fed to the cell), there is an extremely high density of metallic electrocatalyst sites and a low or neglibible amount of hydrophobic sites. On the face of the anode in contact with the electrolyte, on the other hand, the situation is reversed. Catalytic sites are minimal but there is a high density of hydrophobic polymer sites, creating certain desirable surface tension effects with respect to the electrolyte. The electrolyte may become merely a source or sink for electrons and need not intimately participate in the oxidation reaction.

Although this invention is not bound by any theory, it is believed that the heterogeneous reaction system on the surface of the anode in contact with the alkanol vapor approximates the conditions of an anhydrous system, unless, of course, the "fuel" feed to the anode contains water vapor in addition to alkanol vapor. It is further theorized that the "oxidation" of the alkanol to the aldehyde or acid, while correctly termed an "oxidation" can involve at least one and perhaps several dehydrogenation steps in which protons and organic free radicals are formed.

In the case of the methanol-to-formaldehyde reaction, wherein strict control over the oxidation is desired, a substantially anhydrous anode feed is believed to be desirable, e.g. a feed containing less than 10% by volume, preferably less than 1% by volume, of water vapor. For the ethanol-to-acetic acid reaction, on the other hand, there is little or no danger that the oxidation will go all the way to carbon dioxide and the principal problem to be dealt with is "poisoning" of the catalyst. Water vapor in this reaction may even serve a useful purpose, particularly if the electrolyte is acidic rather than basic.

The substantially anhydrous formaldehyde conveyed out of the oxidation zone can be further conveyed to the cathode side of the cell, where reductive dimerization can take place. The $E°$ for the reductive dimerization is not favorable from a thermodynamic standpoint, but the anode half-cell reaction may have some voltameiotic effects.

To minimize the likelihood of poisoning in the ethanol-to-acetic acid reaction, the oxidation (or dehydrogenation) can be carried out in two steps. In the first step, ethanol is converted to acetaldehyde in accordance with the teachings of U.S. Pat. No. 4,347,109. In the second step, the acetaldehyde vapor is brought into contact with an electrocatalyst which is preferably resistant to carbonyl poisoning, unlike some of the noble metals. A noble metal can be used for the first step, however. DETAILED DESCRIPTION As noted previously, the feeding of the alkanol to the anodes can be carried out in substantially the same manner as disclosed in U.S. Pat. No. 4,347,109, particularly in the Examples of that application. The cathode reaction can also be handled in a similar manner. The cathode reaction need not involve the conversion of oxygen to hydroxyl or water but can itself provide a useful product. The conveying of the formaldehyde to the cathode for reductive dimerization has already been mentioned. Other cathode feeds which produce useful products include sulfur dioxide (which can be reduced to dithionate), nitric oxide (which can be reduced to ammonia), and even oxygen itself which can be partially reduced to a peroxide. Other oxidants known in the art include nitric acid, hydrogen peroxide, and the like.

The anode structure in this invention is a matter of great importance. Electrodes of the type made by American Cyanamide of Stamford, Connecticut and known as Type LAA-25 (see J. Electrochem. Soc. 122:1619, at page 1620 [1975])are typical of electrodes which provide a porous catalytic surface on one side and a generally hydrophobic surface on the other, but electrodes of this type can be even further optimized for this invention. The hydrophobic polymer can be a polymerized halogenated or perhalogenated olefin or polyolefin, most preferably a fluorinated polymer such as polytetrafluoroethylene (PTFE) or one of its analogs.

The contact time with the anode should be relatively short in case of a methanol feed and somewhat longer in the case of an ethanol feed. In the case where the ethanol is converted to acetaldehyde in two steps with different electrocatalysts in each step, it is not necessary to have two complete cells. If both anodes and the cathodes all use the same electrolyte, it is only necessary to have a cell provided with two anodes, the second anode receiving the effluent from the first anode. If different electrolytes are necessary or desirable, semi-permeable membranes can be provided so that there can be more than one anolyte and/or catholyte which differs from one or both anolytes. Generally speaking, an acid electrolyte appears to be useful for limiting the oxidation to a single step (e.g. from alkanol to aldehyde) while a basic electrolyte can be useful for converting acetaldehyde to acetic acid. Noble metal catalysts can be used in either acid or basic electrolytes, but non-noble catalysts are generally less subject to electrolyte attack in basic electrolytes. As indicated previously, carbonyl resistant metallic electrocatalysts are known, e.g. tungsten "bronzes", metal oxides such as the iron oxides, etc. Carbonyl poisoning is typically not a problem on the cathode side.

If energy conservation is a particularly serious problem, and it is desired to convert the formaldehyde into a more complex compound through reduction, a sequence of cells can be used, whereby the formaldehyde emerging from an electrogenerative cell having an oxygen electrode is conveyed to the cathode of a second cell, which is supplied with a reducing agent (e.g. $H_2$) at the anode.

For exemplification of a preferred cell configuration for conversion of methanol to formaldehyde and for the first step of the conversion of ethanol to acetic acid, the disclosure of the cell assembly in Example 1 of the aforementioned U.S. Pat. No. 4,347,109 is hereby incorporated by reference.

It is, of course, within the scope of this invention to use chemical synthesis steps subsequent to the electrogenerative or voltameiotic step or steps of this invention. For example, the formaldehyde can be converted to a polymerized material directly from the gaseous form of this compound emerging from the electrogenerative oxidation zone. Similarly, the conversion of the acetaldehyde intermediate to acetic acid can be chemically or electrochemically assisted. Although acetaldehyde is not a particularly good "fuel" for a fuel cell, ethanol is a fairly active fuel, and the first step of the ethanol-to-acetic acid sequence of reactions can provide a substantial voltameiotic (if not electrogenerative) energy benefits.

What is claimed is:

1. A method for making formaldehyde from methanol comprising the steps of:
   (a) bringing methanol vapor into contact with an anode of an electrogenerative or voltameiotic cell, which cell includes the anode, a cathode, an electrolyte within the cell, and external circuit means connecting the cathode to the anode, exterior to the cell; and bringing an oxidant into contact with the cathode; said anode comprising a metallic electrocatalyst and a hydrophobic polymer and having a porous catalytic face for contacting the methanol vapor and an electrolyte face in contact with said electrolyte, the catalytic face defining a face of an electrogenerative or voltameiotic oxidation zone and predominating in metallic electrocatalyst sites, and the electrolyte face predominating in hydrophobic polymer sites;
   (b) anodically treating the methanol vapor by electrogenerative or voltameiotic oxidation in said oxidation zone, thereby forming gaseous formaldehyde in said oxidation zone;
   (c) conveying a major amount of the resulting gaseous formaldehyde out of said oxidation zone, while the formaldehyde is in gaseous form and before it is hydrated with water or oxidized to formic acid or formate.

2. A method according to claim 1, wherein the methanol vapor and the resulting gaseous formaldehyde are substantially anhydrous.

3. A method according to claim 1, wherein the gaseous formaldehyde conveyed out of said oxidation zone is conveyed to the cathode of the cell, where it is reductively dimerized to ethylene glycol.

4. A method according to claim 1 wherein said electrolyte within the cell comprises an acid.

* * * * *